United States Patent
Gao et al.

(10) Patent No.: US 11,695,317 B2
(45) Date of Patent: Jul. 4, 2023

(54) CONVERTER CONTROL METHOD, CONVERTER CONTROL APPARATUS, AND READABLE STORAGE MEDIUM

(71) Applicant: CONTEMPORARY AMPEREX TECHNOLOGY CO., LIMITED, Ningde (CN)

(72) Inventors: Jinfeng Gao, Ningde (CN); Guiying Lin, Ningde (CN); Weichen He, Ningde (CN); Zhimin Dan, Ningde (CN); Lijun Hang, Ningde (CN); Yuanbin He, Ningde (CN); Ke Chen, Ningde (CN); Jiarui Liao, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/856,453

(22) Filed: Jul. 1, 2022

(65) Prior Publication Data
US 2022/0345023 A1    Oct. 27, 2022

Related U.S. Application Data

(63) Continuation of application No. PCT/CN2021/089402, filed on Apr. 23, 2021.

(51) Int. Cl.
*H02M 1/00* (2006.01)
*H02M 3/00* (2006.01)
*H02M 3/335* (2006.01)

(52) U.S. Cl.
CPC ....... *H02M 1/0003* (2021.05); *H02M 1/0025* (2021.05); *H02M 3/01* (2021.05); *H02M 3/33573* (2021.05)

(58) Field of Classification Search
CPC ...... H02M 3/156; H02M 3/158; H02M 3/335; H02M 3/01; H02M 3/1586; H02M 1/0043;
(Continued)

(56) References Cited

U.S. PATENT DOCUMENTS 9,819,191 B1 * 11/2017 Steffan ..................... H02J 3/14
10,530,352 B1 * 1/2020 Morici ................. H02M 3/157
(Continued)

FOREIGN PATENT DOCUMENTS

CN    101826796 A    9/2010
CN    103023330 A    4/2013
(Continued)

OTHER PUBLICATIONS

Woo-Young Choi et al. A hybrid switching scheme for LLC series-resonant half-bridge dc-dc converter in a wide load range, Feb. 21-25, 2010, 2010 Twenty-Fifth Annual IEEE Applied Power Electronics Conference and Exposition (APEC), IEEE DOI: 10.1109/APEC.2010.5433428 (Year: 2010).*
(Continued)

*Primary Examiner* — Gustavo A Rosario-Benitez
(74) *Attorney, Agent, or Firm* — Ladas & Parry LLP

(57) ABSTRACT

Embodiments of this application provide a converter control method, a converter control apparatus, and a readable storage medium. The control method includes: obtaining a real-time input voltage and a real-time output voltage of a converter; determining a corresponding real-time closed-loop control output value of the converter based on the real-time input voltage and the real-time output voltage by using a closed-loop control algorithm; determining a real-time control strategy of a switch tube of the converter from at least three control strategies based on the real-time closed-loop control output value; and controlling the switch
(Continued)

tube based on the determined real-time control strategy. The control method is used to implement efficient and high-precision voltage stabilization control.

20 Claims, 2 Drawing Sheets

(58) Field of Classification Search
CPC ........ H02M 1/00; H02M 1/0025; H02M 1/08; H02M 1/0003
See application file for complete search history.

(56) References Cited

U.S. PATENT DOCUMENTS

| | | | | |
|---|---|---|---|---|
| 2012/0139518 | A1* | 6/2012 | Cleveland | H02M 3/157 323/283 |
| 2013/0093407 | A1 | 4/2013 | Heo et al. | |
| 2013/0214697 | A1* | 8/2013 | Archenhold | H05B 47/18 315/291 |
| 2014/0035628 | A1* | 2/2014 | Oaklander | H02M 1/08 327/109 |
| 2015/0002127 | A1* | 1/2015 | Huang | G05F 1/67 323/311 |
| 2016/0056702 | A1* | 2/2016 | Halim | H02M 1/12 363/74 |
| 2017/0229959 | A1* | 8/2017 | Ausseresse | H02M 3/157 |
| 2018/0153013 | A1* | 5/2018 | Halim | H02M 3/156 |
| 2019/0363709 | A1* | 11/2019 | Bernacchia | H02P 27/04 |
| 2022/0385193 | A1* | 12/2022 | Lai | H02M 3/01 |

FOREIGN PATENT DOCUMENTS

| | | |
|---|---|---|
| CN | 104426364 A | 3/2015 |
| CN | 106130346 A | 11/2016 |
| CN | 106358354 A | 1/2017 |
| CN | 112087140 A | 12/2020 |
| WO | 2021071708 A1 | 4/2021 |

OTHER PUBLICATIONS

International Search Report for International Application No. PCT/CN2021/089402, dated Jan. 12, 2022, 3 pages.
Written Opinion for International Application No. PCT/CN2021/089402, dated Jan. 12, 2022, 3 pages.
Supplementary European Search Report for EP Application No. 21904632.3, dated Dec. 15, 2022, 5 pages.
First Office Action of EP Application No. 21904632.3, dated Jan. 24, 2023, 12 pages.
Chin-Shen Yeh et al, "A Hybrid Modulation Method for Single-Stage Soft-Switching Inverter Based on Series Resonant Converter", IEEE Transactions on Power Electronics, vol. 35, No. 6, Oct. 17, 2019, pp. 5785-5796.
Woo-Young Choi et al. "A Hybrid Switching Scheme for LLC Series-Resonant Half-Bridge DC-DC Converter in a Wide Load Range", Applied Power Electronics Conference and Exposition, Feb. 21, 2010, pp. 1494-1497.
Suthar Chandan et al. "A Pulse density modulated LLC resonant converter based battery charger for HEV/PHEV application", 2019 IEEE International Conference on Electrical, Computer and Communication Technologies, Feb. 20, 2019, pp. 1-7.
Tabata Yoichiro et al. "Frequency Tracking Burst-Mode PDM-controlled Class-D Zero Voltage Soft Switching Resonant Converter for Inductive Power Transfer Applications", The 2018 International Power Electronics Conference, May 20, 2018, pp. 329-336.

* cited by examiner

CONVERTER CONTROL METHOD, CONVERTER CONTROL APPARATUS, AND READABLE STORAGE MEDIUM

CROSS REFERENCE TO RELATED APPLICATION

This application is a continuation of International Patent Application No. PCT/CN2021/089402, filed on Apr. 23, 2021, which is incorporated by reference in its entirety.

TECHNICAL FIELD

This application relates to the field of circuit control technologies, and in particular, to a converter control method, a converter control apparatus, and a readable storage medium.

BACKGROUND

A converter includes a plurality of switch tubes. The converter converts voltage by controlling on or off of the switch tubes. In order to implement voltage stabilization control, converters are usually provided with voltage stabilization control units for stable voltage output.

In the prior art, voltage stabilization control is implemented by intermittently controlling on or off of switch tubes. However, in this control method, control precision is poor and voltage stabilization control efficiency is not ideal.

SUMMARY

This application is intended to provide a converter control method, a converter control apparatus, and a readable storage medium to implement efficient and high-precision voltage stabilization control.

According to a first aspect, this application provides a converter control method, where a converter includes a switch tube and the control method includes: obtaining a real-time input voltage and a real-time output voltage of the converter; determining a corresponding real-time closed-loop control output value of the converter based on the real-time input voltage and the real-time output voltage by using a preset closed-loop control algorithm; determining a real-time control strategy of the switch tube from at least three preset control strategies based on the real-time closed-loop control output value; and controlling the switch tube based on the real-time control strategy.

In the prior art, existing intermittent control is open-loop control, leading to poor control precision. Comparatively, in this application, the real-time closed-loop control output value is determined based on the real-time input voltage and the real-time output voltage, and closed-loop control of the switch tube is implemented based on the real-time closed-loop control output value. This improves control precision compared with open-loop control. In addition, seamless switchover is implemented among the at least three preset control strategies based on the real-time closed-loop control output value, so that a stable voltage can be output when a load changes. A control strategy corresponding to closed-loop control is simple (for example, no high requirement is imposed on selecting a switch wave threshold for the switch tube) and voltage stabilization control efficiency is high, thereby implementing efficient voltage stabilization control.

In a possible implementation, the at least three preset control strategies include at least three of a pulse frequency modulation control strategy, a pulse width modulation control strategy, a pulse density modulation control strategy, and a pulse phase modulation control strategy.

In this application, the pulse frequency modulation control strategy adjusts an output voltage by adjusting a switch frequency, the pulse width modulation control strategy reduces the output voltage by adjusting a pulse output duty cycle, the pulse density modulation control strategy reduces the output voltage by changing a pulse output density, and the pulse phase modulation control strategy changes an output gain by changing a phase-shift angle. By flexibly and smoothly switching among these control strategies based on the real-time closed-loop control output value, efficient and high-precision voltage stabilization control can be implemented.

In a possible implementation, the converter is an isolated resonant direct current converter, and the determining a real-time control strategy of the switch tube from at least three preset control strategies based on the real-time closed-loop control output value includes: if the real-time closed-loop control output value is greater than or equal to a first preset value, determining the pulse frequency modulation control strategy as the real-time control strategy; if the real-time closed-loop control output value is less than the first preset value and greater than a second preset value, determining the pulse width modulation control strategy as the real-time control strategy, where the first preset value is greater than the second preset value; or if the real-time closed-loop control output value is less than or equal to the second preset value, determining the pulse density modulation control strategy as the real-time control strategy.

In this application, for the isolated resonant direct current converter, when the real-time closed-loop control output value varies, the three control strategies, the pulse frequency modulation control strategy, the pulse width modulation control strategy, and the pulse density modulation control strategy, are switched smoothly. This can ensure stable voltage output when a load changes. To be specific, the pulse frequency modulation control strategy is first used to adjust the output voltage. Then, when the output voltage needs to be further decreased, the pulse width modulation control strategy is used to decrease the output voltage. Finally, when a wave needs to be switched off, the pulse density modulation control strategy is used to switch off the wave. In an entire control process, the output voltage changes smoothly.

In a possible implementation, the real-time control strategy is the pulse frequency modulation control strategy, and the controlling the switch tube based on the real-time control strategy includes: modulating a switch frequency of the switch tube to a reciprocal of the real-time closed-loop control output value; and modulating a duty cycle of the switch tube to a first preset duty cycle.

In this application, in the pulse frequency modulation control strategy, the output voltage is adjusted by modulating the switch frequency and the duty cycle.

In a possible implementation, the real-time control strategy is the pulse width modulation control strategy, and the controlling the switch tube based on the real-time control strategy includes: modulating a switch frequency of the switch tube to a reciprocal of the first preset value; and modulating a duty cycle of the switch tube based on the real-time closed-loop control output value and the first preset value.

In this application, in the pulse width modulation control strategy, the output voltage is decreased by modulating the switch frequency and the duty cycle.

In a possible implementation, the real-time control strategy is the pulse density modulation control strategy, and the controlling the switch tube based on the real-time control strategy includes: if the real-time closed-loop control output value is equal to the second preset value, modulating a switch frequency of the switch tube to a reciprocal of the first preset value, and modulating a duty cycle of the switch tube to a second preset duty cycle; or if the real-time closed-loop control output value is less than the second preset value, modulating a duty cycle of the switch tube to 0.

In this application, in the pulse density modulation control strategy, if a wave does not need to be switched off (that is, the real-time closed-loop control output value is equal to the second preset value), the output voltage is further decreased by modulating the switch frequency; and if a wave needs to be switched off (that is, the real-time closed-loop control output value is less than the second preset value), the wave is switched off by modulating the duty cycle to 0.

In a possible implementation, the converter is a phase-shifted full-bridge converter, and the determining a real-time control strategy of the switch tube of the converter from at least three preset control strategies based on the real-time closed-loop control output value includes: if the real-time closed-loop control output value is less than a third preset value, determining the pulse phase modulation control strategy as the real-time control strategy; if the real-time closed-loop control output value is greater than the third preset value, determining the pulse width modulation control strategy as the real-time control strategy; or if the real-time closed-loop control output value and the third preset value satisfy a preset relationship, determining the pulse density modulation control strategy as the real-time control strategy.

In this application, for the phase-shifted full-bridge converter, when the real-time closed-loop control output value varies, the three control strategies, the pulse phase modulation control strategy, the pulse width modulation control strategy, and the pulse density modulation control strategy, are switched smoothly. This can ensure stable voltage output when a load changes. For example, the pulse phase modulation control strategy is first used to adjust the output voltage. Then, when the output voltage needs to be further decreased, the pulse width modulation control strategy is used to decrease the output voltage. Finally, when a wave needs to be switched off, the pulse density modulation control strategy is used to switch off the wave. In an entire control process, the output voltage changes smoothly.

In a possible implementation, the real-time control strategy is the pulse phase modulation control strategy, and the controlling the switch tube based on the real-time control strategy includes: adjusting a phase-shift angle of a pulse waveform between two legs of the phase-shifted full-bridge converter; and modulating a duty cycle of the switch tube to a third preset duty cycle, and modulating a switch frequency of the switch tube to a preset frequency.

In this application, in the pulse phase modulation control strategy, the output voltage is adjusted by modulating the phase-shift angle and the duty cycle.

In a possible implementation, the real-time control strategy is the pulse width modulation control strategy, and the controlling the switch tube based on the real-time control strategy includes: adjusting a phase-shift angle of a pulse waveform between two legs of the phase-shifted full-bridge converter to the third preset value; and modulating a duty cycle of the switch tube based on the third preset value and the real-time closed-loop control output value.

In this application, in the pulse width modulation control strategy, the output voltage can be decreased by modulating the phase-shift angle and the duty cycle.

In a possible implementation, the real-time control strategy is the pulse density modulation control strategy, and the controlling the switch tube based on the real-time control strategy includes: adjusting a phase-shift angle of a pulse waveform between two legs of the phase-shifted full-bridge converter to the third preset value, and modulating a duty cycle of the switch tube to a fourth preset duty cycle; or modulating a duty cycle of the switch tube to 0.

In this application, in the pulse density modulation control strategy, the phase-shift angle can be adjusted and the duty cycle can be fixed, that is, the wave is not switched off. Alternatively, the duty cycle can be modulated to 0, that is, the wave is switched off.

In a possible implementation, the controlling the switch tube based on the real-time control strategy includes: modulating a parameter of the switch tube based on the real-time control strategy, where the parameter of the switch tube includes at least one parameter of a switch frequency, a duty cycle, and a phase-shift angle.

In this application, the at least one parameter of the switch frequency, the duty cycle, and the phase-shift angle of the switch tube can be modulated based on different real-time control strategies to control the output voltage.

According to a second aspect, this application provides a converter control apparatus, where a converter includes a switch tube and the control apparatus includes functional modules configured to implement the converter control method described in the first aspect and in any one of the possible implementations of the first aspect.

In the prior art, existing intermittent control is open-loop control, leading to poor control precision. Comparatively, in this application, the real-time closed-loop control output value is determined based on the real-time input voltage and the real-time output voltage, and closed-loop control of the switch tube is implemented based on the real-time closed-loop control output value. This improves control precision compared with open-loop control. In addition, seamless switchover is implemented among the at least three preset control strategies based on the real-time closed-loop control output value, so that a stable voltage can be output when a load changes. A control strategy corresponding to closed-loop control is simple (for example, no high requirement is imposed on selecting a switch wave threshold for the switch tube) and voltage stabilization control efficiency is high, thereby implementing efficient voltage stabilization control.

According to a third aspect, this application provides a readable storage medium, where the readable storage medium stores a computer program, and when the computer program is run by a computer, the converter control method described in the first aspect and in any one of the possible implementations of the first aspect is implemented.

In the prior art, existing intermittent control is open-loop control, leading to poor control precision. Comparatively, in this application, the real-time closed-loop control output value is determined based on the real-time input voltage and the real-time output voltage, and closed-loop control of the switch tube is implemented based on the real-time closed-loop control output value. This improves control precision compared with open-loop control. In addition, seamless switchover is implemented among the at least three preset control strategies based on the real-time closed-loop control output value, so that a stable voltage can be output when a load changes. A control strategy corresponding to closed-loop control is simple (for example, no high requirement is imposed on selecting a switch wave threshold for the switch tube) and voltage stabilization control efficiency is high, thereby implementing efficient voltage stabilization control.

BRIEF DESCRIPTION OF DRAWINGS

To describe the technical solutions in the embodiments of this application more clearly, the following briefly describes the accompanying drawings required for describing the embodiments of this application. Apparently, the accompanying drawings in the following description show merely some embodiments of this application, and a person of ordinary skill in the art may still derive other drawings from the accompanying drawings without creative efforts.

In the accompanying drawings, the figures are not drawn to scale.

DETAILED DESCRIPTION

The following further describes the embodiments of this application in detail with reference to the accompanying drawings and implementations. The detailed description and accompanying drawings of the following embodiments are used to exemplarily illustrate the principle of this application, but cannot be intended to limit the scope of this application, that is, this application is not limited to the described embodiments.

In the descriptions of this application, it should be understood that, unless otherwise specified, "a plurality of" means more than two; orientations or position relationships indicated by the terms "up", "down", "left", "right", "inside", "outside", and the like are merely intended to simplify description of this application for a purpose of easy description, rather than indicating or implying that an apparatus or a part must have a particular direction or must be constructed and operated in a particular orientation. Therefore, this shall not be construed as any limitation on this application. In addition, the terms "first", "second", "third", and the like are merely intended for a purpose of description, and shall not be understood as an indication or implication of relative importance. "Vertical" is not strictly vertical, but within the allowable range of error. "Parallel" is not strictly parallel, but within the allowable range of error.

The orientation terms appearing in the following description are all directions shown in the figures, and do not limit the specific structure of the application. In the descriptions of this application, it should also be noted that, unless otherwise specified and defined explicitly, the terms "mounted", "interconnected" and "connected" are to be interpreted broadly, for example, may be fixedly connected, or detachably connected, or integrally connected, or may be directly connected, or indirectly connected through an intermediate medium. A person of ordinary skill in the art can understand specific meanings of these terms in this application based on specific situations.

Figure 1:
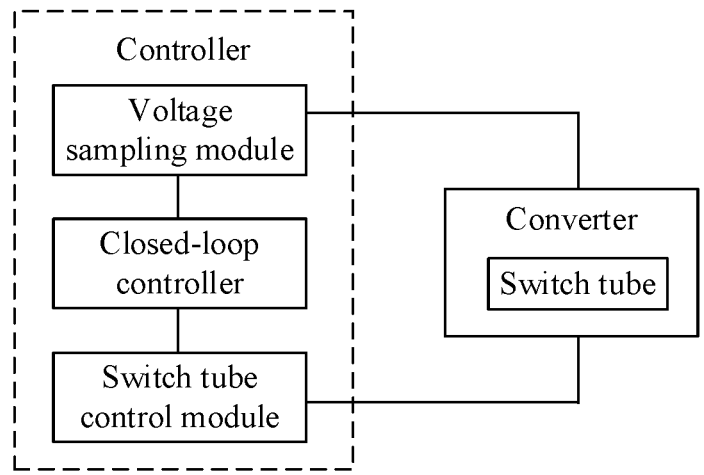
FIG. 1 is a schematic diagram of a connection relationship between a converter and a controller disclosed in an embodiment of this application.

A converter control method provided in an embodiment of this application may be applied to a converter controller. For ease of understanding, FIG. 1 is a schematic diagram of a converter and a controller. The controller includes a voltage sampling module, a closed-loop controller, and a switch tube control module. The converter includes a switch tube. Different converters have switch tubes with different quantities and connection modes. The converter may be an isolated resonant conversion controller (that is, a CLLLC converter) or a phase-shifted full-bridge controller, that is, a PSHB (Phase Bridge) converter.

The converter may be applied to various charging devices to convert signals transmitted by signal sources (for example, batteries) of the charging devices. The charging devices, for example, may be direct current charging piles, smart charging piles, or the like.

The voltage sampling module is connected to the converter and is configured to collect a real-time input voltage and a real-time output voltage of the converter. The closed-loop controller is connected to the voltage sampling module and is configured to determine a closed-loop control strategy. The switch tube control module is connected to the closed-loop controller and the switch tube of the converter separately and is configured to control the switch tube based on the closed-loop control strategy determined by the closed-loop controller. The switch tube control module may be understood as a drive of the converter.

In this embodiment of this application, the closed-loop controller may be a PID controller (Proportion Integration Differentiation, proportional-integral-derivative controller). The PID controller includes a proportional unit P, an integral unit I, and a derivative unit D. A closed-loop control algorithm corresponding to the PID controller is a PID control algorithm. The closed-loop controller may alternatively be other controllers. This is not limited herein.

Figure 2:
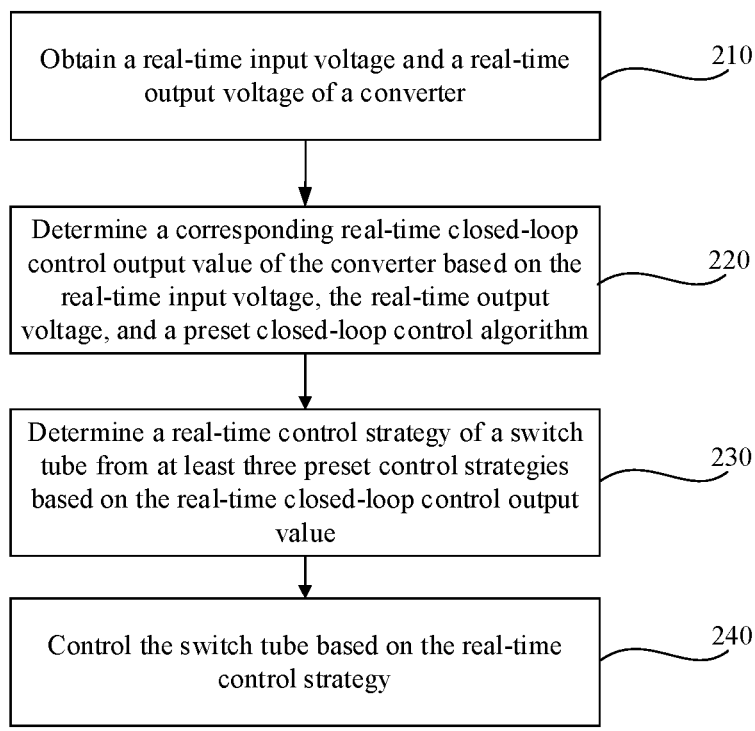
FIG. 2 is a flowchart of a converter control method disclosed in an embodiment of this application.
Figure 3:
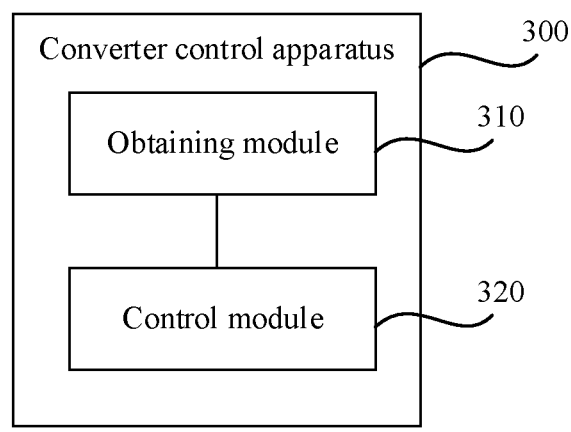
FIG. 3 is a simplified block diagram of a converter control apparatus disclosed in an embodiment of this application.

Based on the foregoing introduction to an application scenario, FIG. 2 is a flowchart of a converter control method provided in an embodiment of this application. The control method includes the following steps.

Step 210: Obtain a real-time input voltage and a real-time output voltage of a converter.

Step 220: Determine a corresponding real-time closed-loop control output value of the converter based on the real-time input voltage and the real-time output voltage by using a preset closed-loop control algorithm.

Step 230: Determine a real-time control strategy of a switch tube from at least three preset control strategies based on the real-time closed-loop control output value.

Step 240: Control the switch tube based on the real-time control strategy.

In the prior art, existing intermittent control is open-loop control, leading to poor control precision. Comparatively, in this embodiment of this application, a real-time closed-loop control output value is determined based on a real-time input voltage and a real-time output voltage, and closed-loop control of a switch tube is implemented based on the real-time closed-loop control output value. This improves control precision compared with open-loop control. In addition, seamless switchover is implemented among at least three preset control strategies based on the real-time closed-loop control output value, so that a stable voltage can be output when a load changes. A control strategy corresponding to closed-loop control is simple (for example, no high requirement is imposed on selecting a switch wave threshold for the switch tube) and voltage stabilization control efficiency is high, thereby implementing efficient voltage stabilization control.

The following introduces a detailed implementation of Step 210 to Step 240.

In Step 210, a controller may obtain the real-time input voltage and the real-time output voltage of the converter by using a voltage sampling module. The real-time output voltage may be a sampling voltage on an output side of the converter, and the real-time input voltage may be a reference voltage on an input side of the converter.

In Step 220, the controller may calculate the real-time input voltage and the real-time output voltage by using a built-in closed-loop control algorithm (that is, a preset closed-loop control algorithm) in a closed-loop controller to determine the real-time closed-loop control output value.

It can be understood that different closed-loop controllers correspond to different closed-loop control algorithms. For example, a PID closed-loop controller corresponds to a PID control algorithm. In this embodiment of this application, if the PID control algorithm is used, a dimension of the finally determined real-time closed-loop control output value is time, and defined as PID.out herein.

In Step 230, the at least three preset control strategies include at least three of a pulse frequency modulation control strategy, a pulse width modulation control strategy, a pulse density modulation control strategy, and a pulse phase modulation control strategy.

The pulse frequency modulation control strategy is also known as a PFM (Pulse Frequency Modulation) control strategy. This control strategy can change an output gain of the converter by adjusting a switch frequency of the switch tube, where output gain=real-time output voltage/real-time input voltage. A higher switch frequency makes a smaller output gain. Therefore, when the switch frequency is modulated, the output gain changes accordingly and the real-time output voltage also changes accordingly.

The pulse width modulation control strategy is also known as a PWM (Pulse Width Modulation) control strategy. This control strategy can decrease an output voltage by adjusting a pulse output duty cycle. In this control strategy, the switch frequency may be fixed and the duty cycle may be within a fixed range.

The pulse density modulation control strategy is also known as a PDM (Pulse Density Modulation) control strategy. This control strategy can further adjust (decrease) the output voltage by adjusting a pulse output density, where the pulse output density may be understood as a quantity of pulse outputs. In this control strategy, the switch frequency may be fixed and the duty cycle may be a fixed value.

The pulse phase modulation control strategy is also known as a PPM (Pulse Phase Modulation) control strategy. This control strategy can change the output gain by adjusting a phase-shift angle between two legs of the converter. A larger phase-shift angle makes a smaller output gain. In this control strategy, the duty cycle may be fixed.

In this embodiment of this application, at least three of the foregoing four control strategies are flexibly and smoothly switched based on the real-time closed-loop control output value to implement efficient and high-precision voltage stabilization control.

It can be learnt from introductions to the control strategies that different control strategies correspond to different parameter control modes. Therefore, in an optional implementation, Step 240 includes: modulating a parameter of the switch tube based on the real-time control strategy, where the parameter of the switch tube includes at least one parameter of a switch frequency, a duty cycle, and a phase-shift angle.

It can be understood that different converters have different circuit structures. Therefore, different converters have different implementations of determining a control strategy and different implementations of the control strategy. In this embodiment of this application, a way to determine the control strategy (that is, the implementation of Step 230) and an implementation of the control strategy (that is, the implementation of Step 240) are introduced separately for an isolated resonant direct current converter and a phase-shifted full-bridge converter.

In an optional implementation, the converter is an isolated resonant direct current converter. In this case, Step 230 includes: if the real-time closed-loop control output value is greater than or equal to a first preset value, determining the pulse frequency modulation control strategy as the real-time control strategy; if the real-time closed-loop control output value is less than the first preset value and greater than a second preset value, determining the pulse width modulation control strategy as the real-time control strategy, where the first preset value is greater than the second preset value; or if the real-time closed-loop control output value is less than or equal to the second preset value, determining the pulse density modulation control strategy as the real-time control strategy.

The first preset value may be a minimum cycle (which is a reciprocal of a maximum switch frequency) for drive control by the switch tube control module. It can be understood that due to a limitation on a hardware condition, a switch frequency of the switch tube cannot be infinite. There is a maximum value. In actual application, the first preset value may be determined based on hardware (for example, a hardware drive circuit or a switch tube). A specific value is not limited in this embodiment of this application. Herein, the first preset value may be defined as Tmin.

The first preset value is greater than the second preset value. In an optional implementation, the second preset value may be A×Tmin. A value of A ranges from 0 to 1. For example, the value of A may be 0.2. In actual application, a specific value of A may be determined based on hardware. This is not limited in this embodiment of this application.

In this embodiment of this application, for the isolated resonant direct current converter, when the real-time closed-loop control output value varies, the three control strategies, the pulse frequency modulation control strategy, the pulse width modulation control strategy, and the pulse density modulation control strategy, are switched smoothly. This can ensure stable voltage output when a load changes. For example, the pulse frequency modulation control strategy is first used to adjust an output voltage. Then, when the output voltage needs to be further decreased, the pulse width modulation control strategy is used to decrease the output voltage. Finally, when a wave needs to be switched off, the pulse density modulation control strategy is used to switch off the wave. In an entire control process, the output voltage changes smoothly.

For example, when PID.out is greater than or equal to Tmin, the switch tube control module uses the pulse frequency modulation control strategy to control the switch tube; when PID.out is less than Tmin and greater than A×Tmin, the switch tube control module uses the pulse width modulation control strategy to control the switch tube; and when PID.out is less than or equal to A×Tmin, the switch tube control module uses the pulse density modulation control strategy to control the switch tube.

In an optional implementation, when the real-time control strategy is the pulse frequency modulation control strategy, Step 240 includes: modulating a switch frequency of the switch tube to a reciprocal of the real-time closed-loop control output value; and modulating a duty cycle of the switch tube to a first preset duty cycle.

The first preset duty cycle may be set based on an actual application scenario. This is not limited in this embodiment of this application. For example, the first preset duty cycle may be 50%.

Correspondingly, the switch frequency of the switch tube is 1/Tmin. The switch frequency may be understood as the maximum switch frequency.

It can be learnt that in the pulse frequency modulation control strategy, the output voltage can be adjusted by modulating the switch frequency and fixing the duty cycle. A higher switch frequency makes a smaller gain.

In an optional implementation, when the real-time control strategy is the pulse width modulation control strategy, Step 240 includes: modulating a switch frequency of the switch tube to a reciprocal of the first preset value; and modulating a duty cycle of the switch tube based on the real-time closed-loop control output value and the first preset value.

A relationship between the duty cycle, the real-time closed-loop control output value, and the first preset value may be: duty cycle=(PID.out×B)/Tmin. A value of B ranges from 0 to 1. For example, the value of B may be 0.5. In actual application, the value of B may be determined based on a value range of the duty cycle of the switch tube. The value range of the duty cycle may be subject to an actual test waveform. In this embodiment of this application, the value range of the duty cycle may be 10% to 50%. When a value of the duty cycle is lower than 10%, a hardware circuit of the isolated resonant direct current converter cannot be switched on.

Correspondingly, the switch frequency of the switch tube is 1/Tmin.

In this control strategy, when the switch frequency of the switch tube is fixed, a smaller duty cycle makes a lower output voltage. As a result, the output voltage can be decreased.

In an optional implementation, when the real-time control strategy is the pulse density modulation control strategy, Step 240 includes: if the real-time closed-loop control output value is equal to the second preset value, modulating a switch frequency of the switch tube to a reciprocal of the first preset value, and modulating a duty cycle of the switch tube to a second preset duty cycle; or if the real-time closed-loop control output value is less than the second preset value, modulating a duty cycle of the switch tube to 0.

The second preset duty cycle may be a minimum duty cycle that can make the converter switched on. For example, the second preset duty cycle may be 10%. Correspondingly, the switch frequency of the switch tube is 1/Tmin.

In the pulse density modulation control strategy, two cases exist. In one case, PID.out equals A×Tmin. In this case, the switch frequency of the switch tube is modulated to the maximum switch frequency and the second preset duty cycle ensures that the converter can be switched on. This can decrease the output voltage. In the other case, PID.out is less than A×Tmin. In this case, the duty cycle may be controlled to be 0, that is, a wave is directly switched off. This may cause the output voltage to continuously decrease. The controller continues to make a decision. For example, the controller may use the pulse frequency modulation control strategy again.

The pulse density modulation control strategy may be understood as changing a pulse output density, that is, changing a quantity of pulse outputs. When the switch frequency and the duty cycle are fixed, a smaller quantity of pulse outputs makes a lower output voltage. This can adjust the output voltage.

For the foregoing three control strategies, when the output voltage needs to be decreased, the controller usually first uses the pulse frequency modulation control strategy. When the switch frequency reaches the maximum switch frequency, the switch frequency is fixed at the maximum switch frequency. Now the pulse width modulation control strategy is used. When the duty cycle reaches the minimum value (the second preset duty cycle), the fixed switch frequency is the maximum switch frequency and the fixed duty cycle is the minimum value. The pulse density modulation control strategy is used.

In actual application, for example, it is assumed that the converter is applied to a direct current charging pile. When the direct current charging pile charges an electric vehicle, an insulation test must be performed first. In this work condition, the direct current charging pile starts with no load. Generally, the lowest output voltage is 250 V. In this case, the pulse frequency modulation control strategy may be used first to increase the switch frequency to the maximum frequency (for example, 390 kHz) and retain the switch frequency at the maximum frequency to obtain a minimum output gain of the direct current charging pile. However, the reference voltage (that is, the voltage on the input side) is lower than an actual sampling voltage (that is, a voltage on the output side). The direct current charging pile may determine, based on the closed-loop control output value, to use the pulse width modulation control strategy and the pulse density modulation control strategy to further decrease the voltage. This implements mixed modulation to satisfy a requirement of lowest output voltage of 250 V for a device.

Therefore, when the isolated resonant direct current converter has a low output voltage or a light load, for example, when the direct current charging pile is charging a vehicle, at a low battery voltage, or at the end of charging, a mixed control strategy that includes pulse frequency modulation, pulse width modulation, and pulse density modulation may be used to implement stable voltage output.

In another optional implementation, the converter is a phase-shifted full-bridge converter. In this case, Step 230 includes: if the real-time closed-loop control output value is less than a third preset value, determining the pulse phase modulation control strategy as the real-time control strategy; if the real-time closed-loop control output value is greater than the third preset value, determining the pulse width modulation control strategy as the real-time control strategy; or if the real-time closed-loop control output value and the third preset value satisfy a preset relationship, determining the pulse density modulation control strategy as the real-time control strategy.

The third preset value is a maximum phase-shift angle of a switch tube of the phase-shifted full-bridge converter. It is assumed that the third preset value is defined as PSHmax, which may be represented by a phase-shift angle corresponding to pulse Tprd/2, where Tprd is a pulse waveform cycle and is a fixed value. Therefore, a specific value of the third preset value depends on the hardware drive circuit and the switch tube. The specific value is not limited in this embodiment of this application.

In an optional implementation, when the pulse density modulation control strategy is used, Tprd/2−(PID.out−PSHmax) is less than or equal to (C×Tprd). Therefore, the preset relationship may be represented as PID.out being equal to or greater than (Tprd/2−C×Tprd+PSHmax). A value of C may be preset based on an actual hardware circuit situation, and ranges from 0 to 1. For example, the value of C may be 0.1.

For example, when a value of PID.out is less than PSHmax (the maximum phase-shift angle), the pulse phase modulation control strategy is used; when the value of PID.out is greater than PSHmax, the pulse width modulation control strategy is used; and when PID.out=Tprd/2−C×Tprd+PSHmax, the pulse density modulation control strategy is used.

It can be learnt that for the phase-shifted full-bridge converter, when the real-time closed-loop control output value varies, the three control strategies, the pulse phase modulation control strategy, the pulse width modulation control strategy, and the pulse density modulation control strategy, are switched smoothly. This can ensure stable voltage output when a load changes. For example, the pulse phase modulation control strategy is first used to adjust the output voltage. Then, when the output voltage needs to be further decreased, the pulse width modulation control strategy is used to decrease the output voltage. Finally, when a wave needs to be switched off, the pulse density modulation control strategy is used to switch off the wave. In an entire control process, the output voltage changes smoothly.

In an optional implementation, if the real-time control strategy is the pulse phase modulation control strategy, Step 240 includes: adjusting a phase-shift angle of a pulse waveform between two legs of the phase-shifted full-bridge converter, modulating a duty cycle of the switch tube to a third preset duty cycle, and modulating a switch frequency of the switch tube to a preset frequency.

The third preset duty cycle may be a maximum duty cycle of the switch tube, for example, 50%. The preset frequency may be a maximum switch frequency of the switch tube or another frequency. In actual application, the third preset duty cycle and the preset frequency may be determined based on a specific application scenario (for example, with reference to an actual waveform situation). This is not limited in this embodiment of this application.

In the pulse phase modulation control strategy, the output gain is changed by adjusting the phase-shift angle between two legs of the phase-shifted full-bridge converter. A larger phase-shift angle makes a smaller output gain.

During modulation of the phase-shift angle, the phase-shift angle may be increased gradually. When the phase-shift angle increases, PID.out changes accordingly and the controller may change the switch tube control strategy accordingly. Therefore, a target value of phase-shift angle modulation may not be required to be set in modulation of the phase-shift angle.

In an optional implementation, if the real-time control strategy is the pulse width modulation control strategy, Step 240 includes: adjusting a phase-shift angle of a pulse waveform between two legs of the phase-shifted full-bridge converter to a third preset value; and modulating a duty cycle of the switch tube based on the third preset value and the real-time closed-loop control output value.

The third preset value is PSHmax (that is, the maximum phase-shift angle) introduced in the foregoing embodiment. A duty cycle modulation method may be modulating the duty cycle to Tprd/2−(PID.out−PSHmax).

During modulation of the duty cycle, similar to the isolated resonant direct current converter, a hardware circuit of the phase-shifted full-bridge converter possibly cannot be switched on when the duty cycle is smaller than the minimum duty cycle. Therefore, Tprd/2−(PID.out−PSHmax) is required to be greater than the minimum duty cycle.

In the pulse width modulation control strategy, the output voltage is adjusted by adjusting the pulse output duty cycle. When the phase-shift angle is fixed at the maximum phase-shift angle, a smaller duty cycle makes a lower output voltage. The duty cycle may be adjusted in a range of 10% to 50%.

In an optional implementation, if the real-time control strategy is the pulse density modulation control strategy, Step 240 includes: adjusting a phase-shift angle of a pulse waveform between two legs of the phase-shifted full-bridge converter to the third preset value, and modulating a duty cycle of the switch tube to a fourth preset duty cycle; or modulating a duty cycle of the switch tube to 0.

The fourth preset duty cycle may be the minimum duty cycle in the foregoing embodiment.

If Tprd/2−(PID.out−PSHmax) is equal to (C×Tprd), the phase-shift angle may be fixed at PSHmax and the duty cycle may be fixed at the fourth preset duty cycle. If Tprd/2−(PID.out−PSHmax) is less than (C×Tprd), the duty cycle may be modulated to 0, that is, a wave is directly switched off. This may cause the output voltage to continuously decrease. The controller continues to determine the real-time closed-loop control output value to switch the control strategy again.

In the pulse density modulation control strategy, the phase-shift angle can be adjusted and the duty cycle can be fixed, that is, the wave is not switched off. Alternatively, the duty cycle can be modulated to 0, that is, the wave is switched off. A modulation method is to change a pulse output density, which may be understood as changing a quantity of pulse outputs. When the switch frequency and the duty cycle are fixed, a smaller quantity of pulse outputs makes a lower output voltage. This can control the output voltage.

Therefore, in this embodiment of this application, in addition to the foregoing mixed control strategy, a mixed control strategy that includes pulse phase modulation, pulse width modulation, and pulse density modulation may be used to implement voltage stabilization output.

An obtaining module 310 is configured to obtain a real-time input voltage and a real-time output voltage of the converter. A control module 320 is configured to determine a real-time closed-loop control output value corresponding to the converter based on the real-time input voltage, the real-time output voltage, and a preset closed-loop control algorithm, determine a real-time control strategy of a switch tube from at least three preset control strategies based on the real-time closed-loop control output value, and control the switch tube based on the real-time control strategy.

In this embodiment of this application, the control module 320 is specifically configured to: if the real-time closed-loop control output value is greater than or equal to a first preset value, determine a pulse frequency modulation control strategy as the real-time control strategy; if the real-time closed-loop control output value is less than the first preset value and greater than a second preset value, determine a pulse width modulation control strategy as the real-time control strategy, where the first preset value is greater than the second preset value; or if the real-time closed-loop control output value is less than or equal to the second preset value, determine a pulse density modulation control strategy as the real-time control strategy.

In this embodiment of this application, the control module 320 is further specifically configured to: modulate a switch frequency of the switch tube to a reciprocal of the real-time closed-loop control output value; and modulate a duty cycle of the switch tube to a first preset duty cycle.

In this embodiment of this application, the control module 320 is further specifically configured to: modulate a switch frequency of the switch tube to a reciprocal of the first preset value; and modulate a duty cycle of the switch tube based on the real-time closed-loop control output value and the first preset value.

In this embodiment of this application, the control module 320 is further specifically configured to: if the real-time closed-loop control output value is equal to the second preset value, modulate a switch frequency of the switch tube to a reciprocal of the first preset value, and modulate a duty cycle of the switch tube to a second preset duty cycle; or if the real-time closed-loop control output value is less than the second preset value, modulate a duty cycle of the switch tube to 0.

In this embodiment of this application, the control module 320 is further specifically configured to: if the real-time closed-loop control output value is less than a third preset value, determine a pulse phase modulation control strategy as the real-time control strategy; if the real-time closed-loop control output value is greater than the third preset value, determine the pulse width modulation control strategy as the real-time control strategy; or if the real-time closed-loop control output value and the third preset value satisfy a preset relationship, determine the pulse density modulation control strategy as the real-time control strategy.

In this embodiment of this application, the control module 320 is further specifically configured to: adjust a phase-shift angle of a pulse waveform between two legs of a phase-shifted full-bridge converter; and modulate a duty cycle of the switch tube to a third preset duty cycle, and modulate a switch frequency of the switch tube to a preset frequency.

In this embodiment of this application, the control module 320 is further specifically configured to: adjust a phase-shift angle of a pulse waveform between two legs of a phase-shifted full-bridge converter to the third preset value; and modulate a duty cycle of the switch tube based on the third preset value and the real-time closed-loop control output value.

In this embodiment of this application, the control module 320 is further specifically configured to: adjust a phase-shift angle of a pulse waveform between two legs of a phase-shifted full-bridge converter to the third preset value, and modulate a duty cycle of the switch tube to a fourth preset duty cycle; or modulate a duty cycle of the switch tube to 0.

In this embodiment of this application, the control module 320 is further specifically configured to: modulate a parameter of the switch tube based on the real-time control strategy, where the parameter of the switch tube includes at least one parameter of a switch frequency, a duty cycle, and a phase-shift angle.

A converter control apparatus 300 corresponds to the converter control method in the foregoing embodiment, and its modules are in one-to-one correspondence to the steps of the converter control method. Therefore, the modules are implemented with reference to implementations of the steps in the foregoing embodiment and are not repeated herein.

Based on the same inventive concept, an embodiment of this application further provides a readable storage medium, where the readable storage medium stores a computer program, and when the computer program is run by a computer, the converter control method described in the foregoing embodiments is implemented.

Although this application has been described with reference to the preferred embodiments, various modifications can be made to this application without departing from the scope of this application and the components therein can be replaced with equivalents. In particular, as long as there is no structural conflict, the various technical features mentioned in the embodiments can be combined in any manner. This application is not limited to the specific embodiments disclosed in this specification, but includes all technical solutions falling within the scope of the claims.

What is claimed is:

1. A method for controlling a converter, wherein the converter comprises a switch tube, and the method comprises:
   obtaining a real-time input voltage and a real-time output voltage of the converter;
   determining a corresponding real-time closed-loop control output value of the converter based on the real-time input voltage and the real-time output voltage by using a closed-loop control algorithm;
   determining a real-time control strategy of the switch tube from a plurality of control strategies based on the real-time closed-loop control output value; and
   controlling the switch tube based on the determined real-time control strategy;
   wherein when the converter is an isolated resonant direct current converter, determining the real-time control strategy of the switch tube from the plurality of control strategies based on the real-time closed-loop control output value comprises:
     when the real-time closed-loop control output value is greater than or equal to a first preset value, determining the real-time control strategy as a pulse frequency modulation control strategy;
     when the real-time closed-loop control output value is less than the first preset value and greater than a second preset value, determining the real-time control strategy as a pulse width modulation control strategy, wherein the first preset value is greater than the second preset value; and
     when the real-time closed-loop control output value is less than or equal to the second preset value, determining the real-time control strategy as a pulse density modulation control strategy.

2. The method according to claim 1, wherein the plurality of control strategies comprise at least three of:
   a pulse frequency modulation control strategy,
   a pulse width modulation control strategy,
   a pulse density modulation control strategy, and
   a pulse phase modulation control strategy.

3. The method according to claim 1, wherein when the real-time control strategy is determined to be the pulse frequency modulation control strategy, controlling the switch tube based on the determined real-time control strategy comprises:
   modulating a switch frequency of the switch tube to a reciprocal of the real-time closed-loop control output value; and
   modulating a duty cycle of the switch tube to a first preset duty cycle.

4. The method according to claim 1, wherein when the real-time control strategy is determined to be the pulse width modulation control strategy, controlling the switch tube based on the determined real-time control strategy comprises:
   modulating a switch frequency of the switch tube to a reciprocal of the first preset value; and
   modulating a duty cycle of the switch tube based on the real-time closed-loop control output value and the first preset value.

5. The control method according to claim 1, wherein when the real-time control strategy is determined to be the pulse density modulation control strategy, controlling the switch tube based on the determined real-time control strategy comprises:
   when the real-time closed-loop control output value is equal to the second preset value, modulating a switch frequency of the switch tube to a reciprocal of the first preset value, and modulating a duty cycle of the switch tube to a second preset duty cycle; and when the real-time closed-loop control output value is less than the second preset value, modulating a duty cycle of the switch tube to 0.

6. The control method according to claim 1, wherein when the converter is a phase-shifted full-bridge converter, determining the real-time control strategy of the switch tube from the plurality of the control strategies based on the real-time closed-loop control output value comprises:

when the real-time closed-loop control output value is less than a third preset value, determining the real-time control strategy as a pulse phase modulation control strategy;

when the real-time closed-loop control output value is greater than the third preset value, determining the real-time control strategy as the pulse width modulation control strategy; and when the real-time closed-loop control output value and the third preset value satisfy a preset relationship, determining the real-time control strategy as the pulse density modulation control strategy.

7. The method according to claim 6, wherein when the real-time control strategy is determined to be the pulse phase modulation control strategy, controlling the switch tube based on the determined real-time control strategy comprises:

adjusting a phase-shift angle of a pulse waveform between two legs of the phase-shifted full-bridge converter; and modulating a duty cycle of the switch tube to a third preset duty cycle, and modulating a switch frequency of the switch tube to a preset frequency.

8. The method according to claim 6, wherein when the real-time control strategy is determined to be the pulse width modulation control strategy, controlling the switch tube based on the determined real-time control strategy comprises:

adjusting a phase-shift angle of a pulse waveform between two legs of the phase-shifted full-bridge converter to the third preset value; and modulating a duty cycle of the switch tube based on the third preset value and the real-time closed-loop control output value.

9. The method according to claim 6, wherein when the real-time control strategy is determined to be the pulse density modulation control strategy, controlling the switch tube based on the determined real-time control strategy comprises:

adjusting a phase-shift angle of a pulse waveform between two legs of the phase-shifted full-bridge converter to the third preset value, and modulating a duty cycle of the switch tube to a fourth preset duty cycle; or modulating a duty cycle of the switch tube to 0.

10. The method according to claim 1, wherein controlling the switch tube based on the determined real-time control strategy comprises:

modulating a parameter of the switch tube based on the real-time control strategy;

wherein the parameter of the switch tube comprises at least one of:

a switch frequency,
a duty cycle, and
a phase-shift angle.

11. An apparatus for controlling a converter, wherein the converter comprises a switch tube, and the apparatus comprises:

a voltage censoring circuit, configured to obtain a real-time input voltage and a real-time output voltage of the converter; and a control unit comprising a processor and a memory storing a program for execution by the processor, configured to:

determine a corresponding real-time closed-loop control output value of the converter based on the real-time input voltage and the real-time output voltage by using a closed-loop control algorithm;

determine a real-time control strategy of the switch tube from a plurality of control strategies based on the real-time closed-loop control output value; and control the switch tube based on the determined real-time control strategy;

wherein when the converter is an isolated resonant direct current converter, in determining the real-time control strategy of the switch tube from the plurality of control strategies based on the real-time closed-loop control output value, the control unit is configured to:

when the real-time closed-loop control output value is greater than or equal to a first preset value, determine the real-time control strategy as a pulse frequency modulation control strategy;

when the real-time closed-loop control output value is less than the first preset value and greater than a second preset value, determine the real-time control strategy as a pulse width modulation control strategy, wherein the first preset value is greater than the second preset value; and when the real-time closed-loop control output value is less than or equal to the second preset value, determine the real-time control strategy as a pulse density modulation control strategy.

12. The apparatus according to claim 11, wherein the plurality of control strategies comprise at least three of:

a pulse frequency modulation control strategy,
a pulse width modulation control strategy,
a pulse density modulation control strategy, and
a pulse phase modulation control strategy.

13. The apparatus according to claim 11, wherein when the real-time control strategy is determined to be the pulse frequency modulation control strategy, in controlling the switch tube based on the determined real-time control strategy, the control unit is configured to:

modulate a switch frequency of the switch tube to a reciprocal of the real-time closed-loop control output value; and modulate a duty cycle of the switch tube to a first preset duty cycle.

14. The apparatus according to claim 11, wherein when the converter is a phase-shifted full-bridge converter, in determining the real-time control strategy of the switch tube from the plurality of the control strategies based on the real-time closed-loop control output value, the control unit is configured to:

when the real-time closed-loop control output value is less than a third preset value, determine the real-time control strategy as a pulse phase modulation control strategy;

when the real-time closed-loop control output value is greater than the third preset value, determine the real-time control strategy as the pulse width modulation control strategy; and when the real-time closed-loop control output value and the third preset value satisfy a preset relationship, determine the real-time control strategy as the pulse density modulation control strategy.

15. The apparatus according to claim 14, wherein,
when the real-time control strategy is determined to be the pulse phase modulation control strategy, in determining a real-time control strategy of the switch tube from the plurality of the control strategies based on the real-time closed-loop control output value, the control unit is configured to:
adjust a phase-shift angle of a pulse waveform between two legs of the phase-shifted full-bridge converter; and
modulate a duty cycle of the switch tube to a third preset duty cycle, and modulate a switch frequency of the switch tube to a preset frequency;
when the real-time control strategy is determined to be the pulse width modulation control strategy, in determining a real-time control strategy of the switch tube from the plurality of the control strategies based on the real-time closed-loop control output value, the control unit is configured to:
adjust a phase-shift angle of a pulse waveform between two legs of the phase-shifted full-bridge converter to the third preset value; and
modulate a duty cycle of the switch tube based on the third preset value and the real-time closed-loop control output value;
when the real-time control strategy is determined to be the pulse density modulation control strategy, in determining a real-time control strategy of the switch tube from the plurality of the control strategies based on the real-time closed-loop control output value, the control unit is configured to:
adjust a phase-shift angle of a pulse waveform between two legs of the phase-shifted full-bridge converter to the third preset value, and modulate a duty cycle of the switch tube to a fourth preset duty cycle; or
modulate a duty cycle of the switch tube to 0.

16. The control apparatus according to claim 11, wherein in controlling the switch tube based on the determined real-time control strategy, the control unit is configured to:
modulate a parameter of the switch tube based on the real-time control strategy;
wherein the parameter of the switch tube comprises at least one of:
a switch frequency,
a duty cycle, and
a phase-shift angle.

17. The apparatus according to claim 11, wherein when the real-time control strategy is determined to be the pulse width modulation control strategy, in controlling the switch tube based on the determined real-time control strategy, the control unit is configured to:
modulate a switch frequency of the switch tube to a reciprocal of the first preset value; and
modulate a duty cycle of the switch tube based on the real-time closed-loop control output value and the first preset value.

18. The apparatus according to claim 11, wherein when the real-time control strategy is determined to be the pulse density modulation control strategy, in controlling the switch tube based on the determined real-time control strategy, the control unit is configured to:
when the real-time closed-loop control output value is equal to the second preset value, modulate a switch frequency of the switch tube to a reciprocal of the first preset value, and modulate a duty cycle of the switch tube to a second preset duty cycle; and
when the real-time closed-loop control output value is less than the second preset value, modulate a duty cycle of the switch tube to 0.

19. A non-transitory computer readable storage medium configured to store a computer program, wherein when the computer program is executed by a processor of a controlling apparatus, the apparatus performs a process for controlling a converter that comprises:
obtaining a real-time input voltage and a real-time output voltage of the converter;
determining a corresponding real-time closed-loop control output value of the converter based on the real-time input voltage and the real-time output voltage by using a closed-loop control algorithm;
determining a real-time control strategy of a switch tube of the converter from a plurality of control strategies based on the real-time closed-loop control output value; and
controlling the switch tube based on the determined real-time control strategy;
wherein when the converter is an isolated resonant direct current converter, determining the real-time control strategy of the switch tube from the plurality of control strategies based on the real-time closed-loop control output value comprises:
when the real-time closed-loop control output value is greater than or equal to a first preset value, determining the real-time control strategy as a pulse frequency modulation control strategy;
when the real-time closed-loop control output value is less than the first preset value and greater than a second preset value, determining the real-time control strategy as a pulse width modulation control strategy, wherein the first preset value is greater than the second preset value; and
when the real-time closed-loop control output value is less than or equal to the second preset value, determining the real-time control strategy as a pulse density modulation control strategy.

20. The non-transitory computer readable storage medium according to claim 19, wherein when the converter is a phase-shifted full-bridge converter, determining the real-time control strategy of the switch tube from the plurality of the control strategies based on the real-time closed-loop control output value comprises:
when the real-time closed-loop control output value is less than a third preset value, determining the real-time control strategy as a pulse phase modulation control strategy;
when the real-time closed-loop control output value is greater than the third preset value, determining the real-time control strategy as the pulse width modulation control strategy; and
when the real-time closed-loop control output value and the third preset value satisfy a preset relationship, determining the real-time control strategy as the pulse density modulation control strategy.

* * * * *